(12) United States Patent
Kirchner et al.

(10) Patent No.: US 8,289,153 B2
(45) Date of Patent: Oct. 16, 2012

(54) DISSEMINATION OF CRITICAL ATMOSPHERIC CONDITIONS WITHIN GLOBAL AND REGIONAL NAVIGATION SATELLITE SYSTEMS

(75) Inventors: Michael Kirchner, Munich (DE); Tanja Rang, Grasbrunn (DE); Hans L. Trautenberg, Ottobrunn (DE)

(73) Assignee: Astrium GmbH, Munich (DE)

( * ) Notice: Subject to any disclaimer, the term of this patent is extended or adjusted under 35 U.S.C. 154(b) by 671 days.

(21) Appl. No.: 12/138,728

(22) Filed: Jun. 13, 2008

(65) Prior Publication Data
US 2009/0322515 A1 Dec. 31, 2009

(30) Foreign Application Priority Data

Jun. 13, 2007 (EP) ..................... 07011586

(51) Int. Cl.
*G08B 1/08* (2006.01)

(52) U.S. Cl. ................. 340/539.13; 340/425.5; 340/928

(58) Field of Classification Search ............. 340/539.13, 340/539.1, 971, 626, 436, 438, 435, 903, 340/905, 928, 521, 425.5
See application file for complete search history.

(56) References Cited

U.S. PATENT DOCUMENTS

| | | | |
|---|---|---|---|
| 4,933,911 A * | 6/1990 | Sondergeld et al. ............ 367/13 |
| 5,675,081 A * | 10/1997 | Solheim et al. ............ 73/170.28 |
| 6,646,559 B2 * | 11/2003 | Smith ........................ 340/601 |
| 6,816,878 B1 * | 11/2004 | Zimmers et al. .............. 709/200 |
| 7,080,544 B2 * | 7/2006 | Stepanik et al. ............ 73/31.02 |
| 7,102,496 B1 * | 9/2006 | Ernst et al. .................. 340/436 |
| 7,124,027 B1 * | 10/2006 | Ernst et al. .................... 701/301 |
| 7,156,129 B2 * | 1/2007 | Speasl et al. ..................... 141/83 |
| 2002/0199196 A1 | 12/2002 | Rabinowitz et al. |
| 2004/0080430 A1 * | 4/2004 | Videtich ....................... 340/905 |
| 2004/0181340 A1 * | 9/2004 | Smith ................................ 702/3 |
| 2004/0246145 A1 * | 12/2004 | Andrews et al. .............. 340/971 |
| 2005/0258971 A1 * | 11/2005 | Greenstein et al. ........... 340/601 |
| 2006/0106540 A1 * | 5/2006 | Campbell ......................... 702/4 |
| 2006/0214844 A1 | 9/2006 | Fagan et al. |
| 2006/0229810 A1 | 10/2006 | Cross et al. |

FOREIGN PATENT DOCUMENTS

| WO | WO-2004/009055 A1 | 11/2004 |
| WO | WO-2007/022869 A1 | 3/2007 |

* cited by examiner

*Primary Examiner* — Daniel Previl
(74) *Attorney, Agent, or Firm* — Greenblum & Bernstein, P.L.C.

(57) ABSTRACT

The invention relates to an apparatus for a regional or global navigation satellite system that includes an arrangement for receiving additional data or navigation messages from the navigation satellite system, and an arrangement for informing or alarming the user that critical atmospheric conditions occur, whereby the additional data or the navigation messages include atmospheric information.

17 Claims, 1 Drawing Sheet

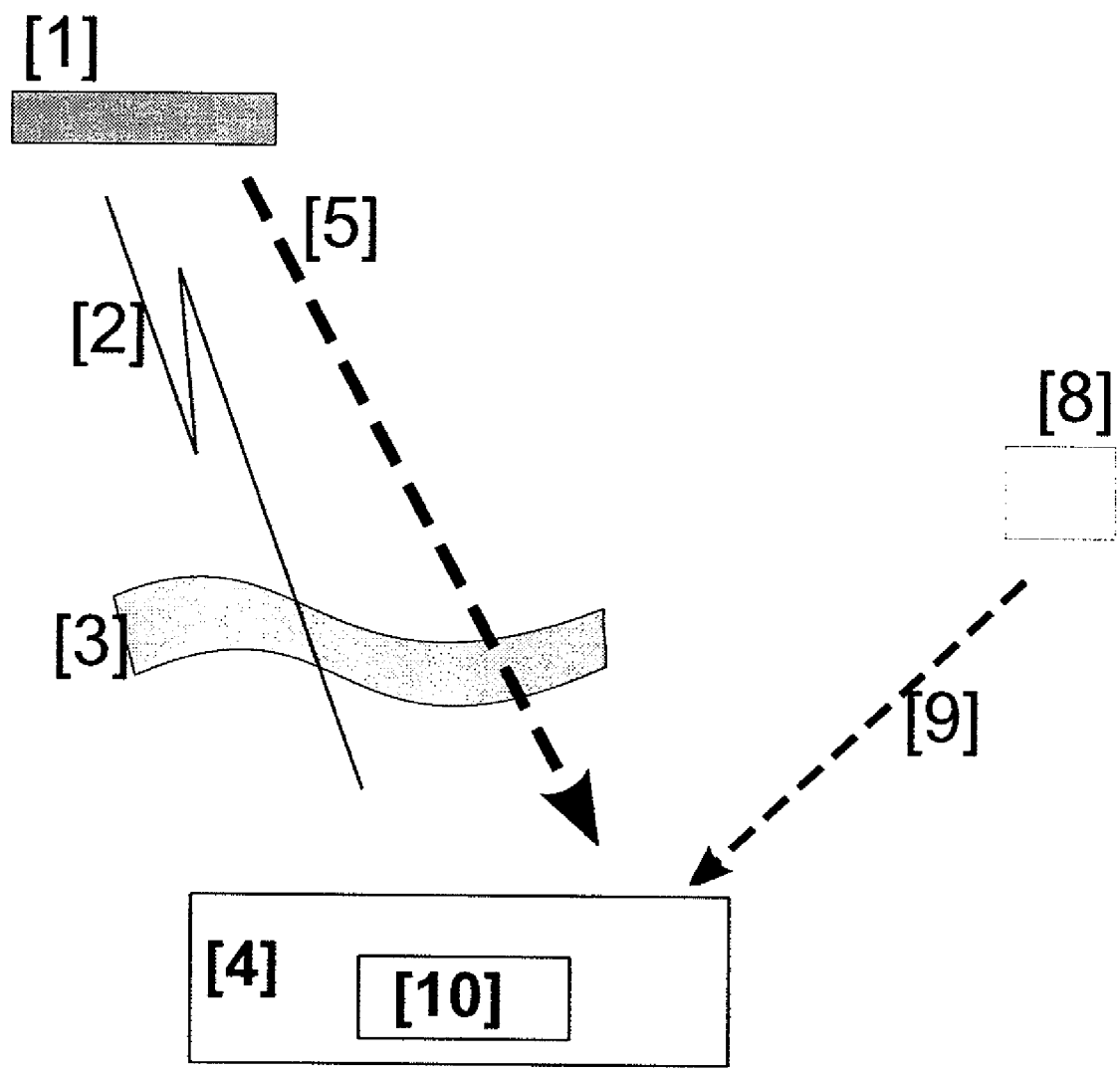

DISSEMINATION OF CRITICAL ATMOSPHERIC CONDITIONS WITHIN GLOBAL AND REGIONAL NAVIGATION SATELLITE SYSTEMS

CROSS-REFERENCE TO RELATED APPLICATIONS

The present application claims priority under 35 U.S.C. §119(a) of European Patent Application No. 07 011 586.0 filed Jun. 13, 2007, the disclosure of which is expressly incorporated by reference herein in its entirety.

BACKGROUND OF THE INVENTION

1. Field of the Invention

The present invention relates to the dissemination of information about critical atmospheric conditions within the navigation message of regional and global navigation satellite systems (GNSS).

2. Description of Background and Other Information

One of the major sources of error for the measurement of GNSS ranging signals is the propagation delay caused by the atmosphere. While the ionospheric delay can be significantly reduced using two-frequency measurements, the delay caused by the troposphere is either completely ignored or statically modeled by the user. Due to a lag of information, actual atmospheric conditions are not considered for this modeling which results in a large contribution of the respective modeling error of the user ranging error in case of abnormal atmospheric conditions. From the perspective of accuracy and integrity, large margins are necessary in the system design to cover those very rare cases of mismodelling.

For the Galileo user receiver (user segment) a static set of parameters and a model is defined which is implemented in the receiver and used to model a major part of the tropospheric signal propagation delay. Parameters for a simple ionospheric model are disseminated in the navigation message of the system. These models are used by the user to correct the atmospheric propagation delay of the received signal. Due to (a) the static parameters (for troposphere) and (b) the simplicity of the model (for ionosphere) both strategies are limited to nominal atmospheric conditions only.

In other words, the prior art provides a solution to the problem of the atmospheric propagation delay of a received signal by correction of this delay. However, this correction of the prior art is limited to averaged nominal atmospheric conditions.

Correction of the atmospheric propagation delay of a received signal in critical atmospheric conditions are not known in the prior art. Within the meaning of the present invention, critical atmospheric conditions are meant to be situations for a specific user location for which the defined built-in correction models at the user receiver do not satisfy the user requirements or even lead to a non-availability of a specific service. Critical atmospheric conditions such as very low-pressure areas or short term ionospheric storms occur rarely but increase the modeling error of the user dramatically.

Since such critical atmospheric conditions will lead to a significant degradation of the quality of navigation, certain related services, or to integrity failures, it is necessary to detect such conditions and to alarm the user about such conditions.

SUMMARY OF THE INVENTION

The present invention is directed to an apparatus and to a process which enables a regional or a global navigation satellite system to perform in accordance with requirements even under critical atmospheric conditions.

One of the main features of the present invention is that a receiver of the GNSS is informed about critical atmospheric conditions and can, therefore, adapt to these conditions accordingly. Consequently, the invention enables a GNSS to perform in accordance with the requirements even under critical atmospheric conditions.

For the design of a global as well as a regional navigation satellite system a specific user ranging error is assumed to which atmospheric mismodellng contributes strongly. By warning the user in case of critical atmospheric conditions this contribution could be significantly reduced.

Therefore, it is an advantage of the present invention that less stringent requirements for the accuracy of ranging signals and navigation data—especially in terms of integrity—are needed to reach the same or even a better quality of service under the same conditions and with the same performances of the ranging signals and navigation/service data.

BRIEF DESCRIPTION OF THE DRAWING

The invention is explained in more detail below based on an exemplary embodiment. The FIGURE shows a schematic representation of an exemplary embodiment in accordance with aspects of the invention.

DETAILED DESCRIPTION OF THE INVENTION

As shown in the FIGURE, the satellites 1 of a regional or a global navigation satellite system do not only provide ranging codes and navigation data 2 but also disseminate additional data 5 (e.g. atmospherical information) necessary for navigation or other specific services. Although the description mainly refers to GNSS the present invention is also applicable to regional navigation satellite systems or a combination of global and regional satellite systems. The reference to GNSS is only for the purpose of description.

Providers of Information about Critical Atmospheric Conditions

According to one embodiment of the present invention, information about critical atmospheric conditions in the atmosphere 3 is determined and provided by a monitoring network of the GNSS.

However, the invention is not limited to the determination of critical atmospheric conditions by processing results of a monitoring network of the GNSS. According to other embodiments of the present invention, direct links 9 are established to alternative sources 8 (e.g., providers of global and/or regional-scale numerical weather models and products). By this the GNSS can benefit not only from the global view of the current atmospheric conditions but also from a very good short-term prediction.

According to another embodiment of the present invention the global view of the current atmospheric conditions and the short-term predictions are combined with the data of the GNSS monitoring network and assessed with respect to (a) the user algorithms and (b) system algorithms before generating the information disseminated to a user.

Dissemination of Atmospheric Information

In all of these embodiments just described, a user, i.e., a user of a receiver 4 of a user segment, is, based on the above data, informed about critical atmospheric conditions. This information is included in the additional (or augmentation) data 5 or in the navigation messages 2 distributed by the system.

These additional data or these navigation messages are disseminated by the GNSS together with the messages comprised by the ranging codes.

Since the data rate for the messages on the navigation ranging codes is very limited, the present invention discloses four possibilities for disseminating atmospheric information.

According to one embodiment of the present invention, the information about critical atmospheric conditions is to inform about locations in the service area for which a specific service (integrity of accuracy) is currently not available. This can even be reduced down to the bit level (but still region dependent).

According to another embodiment of the present invention, the information about critical atmospheric conditions is processed within the ground segment of the GNSS in a way that a user-location dependent set of scale parameters is estimated. These scale parameters re-scale the defined built-in user models in a way that the result represents the actual atmospheric conditions at specific locations of the service area best. Only the set of scale parameters of the specific locations are disseminated to the user.

According to another embodiment of the present invention, as there are at any instance in time only a few maxima and minima in the pressure measured on the surface of the Earth, it is foreseen to disseminate the approximate location of these maxima and minima together with the pressure and the size of the deviation from the standard range of pressure variations.

According to another embodiment of the present invention, the same as in the previous embodiment shalt also be considered for the absolute content of atmospheric water vapor.

For the first two options and the last option the fragmentation of the service area into atmospheric related sub-areas is optimized with respect to the spare message space available. The information to be transferred by the satellites 1 can further be limited in a way that each satellite 1 transmits only the information relevant for its respective service area.

The invention is not restricted to user receivers 4 of the user segment of the GNSS, but can also be applied to other receivers. The invention is further not restricted to the dissemination of the atmospheric information by the satellites 1 of the GNSS; this information can also be disseminated by other elements of the GNSS, e.g., directly by the monitoring network of the GNSS.

Arbitrary combinations of the embodiments above relating to providers of information about critical atmospheric conditions and dissemination of critical atmospheric conditions are also meant to be disclosed by the present invention.

Process for the Dissemination of Atmospheric Information

As a further embodiment, the present invention discloses a process for the dissemination of critical atmospheric conditions within global or regional navigation satellite systems. Although the description mainly refers to GNSS, the present invention is also applicable to regional navigation satellite systems or a combination of global and regional satellite systems. The reference to GNSS is only for the purpose of description.

In a first step, the atmospheric information, e.g., critical atmospheric conditions, is determined by a monitoring network of the GNSS. As already indicated above, direct links are established to providers of global and/or regional-scale numerical weather models and products.

In a second step, the atmospheric information, e.g., about critical atmospheric conditions, is provided by a monitoring network of the GNSS and disseminated to the satellites 1 of the GNSS.

In a third step, the atmospheric information, e.g., about critical atmospheric conditions, is disseminated as additional data 5 or as part of navigation messages 2 by the satellites 1 to the receivers 4 of the user segment or other receivers of the GNSS.

The dissemination of this atmospheric information is in accordance with one of the four possibilities described above. In other words, in one embodiment of the process the atmospheric information comprises information to inform about locations in the service area for which a specific service is currently not available due to critical atmospheric conditions.

In another embodiment of the process the atmospheric information is processed such that a user-location dependent set of scale parameters is estimated and the receiver is adapted accordingly.

In another embodiment of the process the atmospheric information comprises approximate locations of maxima and/or minima in the pressure measured on the surface of the Earth together with the pressure and the size of the deviation from the standard range of pressure variations.

In a further embodiment of the process the atmospheric information comprises approximate locations of maxima and/or minima in the atmospheric water vapor on the surface of the Earth are distributed together with the water vapor and the size of the deviation from the standard range of water vapor variations.

In a fourth step, the user of the receiving apparatus 4 is informed via an indicator 10 about the atmospheric conditions (based on the atmospheric information) and/or alarmed about critical atmospheric conditions in case those occur. The positioning algorithms in the user receiver 4 take this information into account.

The invention claimed is:

1. An apparatus for a regional or global navigation satellite system comprising:
    a system for receiving information from the navigation satellite system, said information including (1) information which does not include information representative of critical atmospheric conditions, and (2) information representative of atmospheric conditions, including information representative of critical atmospheric conditions; and
    an indicator for informing or alarming a user, when critical atmospheric conditions occur, that critical atmospheric conditions are occurring.

2. An apparatus according to claim 1, wherein:
    said information which does not include information representative of critical atmospheric conditions comprises ranging codes and navigation data.

3. An apparatus according to claim 1, wherein:
    the system for receiving information from the navigation satellite system for providing said information representative of atmospheric conditions includes a monitoring network for providing said information representative of atmospheric conditions.

4. An apparatus according to claim 1, wherein:
    the system for receiving information from the navigation satellite system for providing said information representative of atmospheric conditions includes direct links to providers of global and/or regional-scale numerical weather models and products.

5. An apparatus according to claim 1, wherein:
    the system for receiving information from the navigation satellite system for providing said information representative of atmospheric conditions includes (1) a monitoring network for providing said information representative of atmospheric conditions and (2) direct links to providers of global and/or regional-scale numerical weather models and products.

6. An apparatus according to claim 1, wherein:
the apparatus is part of a receiver of a user of a user segment for providing said information representative of atmospheric conditions to said user.

7. An apparatus according to claim 1, wherein:
the atmospheric information comprises information about locations in a service area for which a specific service is currently not available due to critical atmospheric conditions.

8. An apparatus according to claim 7, wherein:
fragmentation of the service area into atmospheric related sub-areas is optimized with respect to an available spare message space.

9. An apparatus according to claim 1, wherein:
the atmospheric information is processed such that a user-location dependent set of scale parameters is estimated.

10. An apparatus according to claim 9, wherein:
only the set of scale parameters of the specific locations are disseminated to the user.

11. An apparatus according to claim 1, wherein:
the atmospheric information comprises information about approximate locations of maxima and/or minima in a pressure measured on an Earth surface are distributed together with the pressure and the size of the deviation from the standard range of pressure variations.

12. An apparatus according to claim 1, wherein:
the atmospheric information comprises information about approximate locations of maxima and/or minima in atmospheric water vapor on an Earth surface are distributed together with the water vapor and a deviation size from a standard range of water vapor variations.

13. A process for a regional or global navigation satellite system (GNSS), said process comprising:
determining atmospheric information;
disseminating the atmospheric information to the satellites of the GNSS;
disseminating the atmospheric information to receivers of the GNSS;
informing a user of the receiver about the atmospheric information; and
alarming the user of the receiver about critical atmospheric conditions when such conditions occur.

14. A process according to claim 13, wherein:
the atmospheric information comprises information to inform about locations in the service area for which a specific service is currently not available due to critical atmospheric conditions.

15. A process according to claim 13, wherein:
the atmospheric information is processed such that a user-location dependent set of scale parameters is estimated.

16. A process according to claim 13, wherein:
the atmospheric information comprises approximate locations of maxima and/or minima in pressure measured on an Earth surface together with pressure and a deviation size from a standard range of pressure variations.

17. A process according to claim 13, wherein:
the atmospheric information comprises approximate locations of maxima and/or minima in atmospheric water vapor on an Earth surface are distributed together with the water vapor and a deviation size from a standard range of water vapor variations.

* * * * *